(12) United States Patent
Wang

(10) Patent No.: US 7,042,204 B2
(45) Date of Patent: May 9, 2006

(54) VOLTAGE SOURCE AND CURRENT SOURCE WITH CAPACITOR

(75) Inventor: Guo-Hua Wang, Yamatokohriyama (JP)

(73) Assignee: Nitta Corporation, Osaka (JP)

( * ) Notice: Subject to any disclaimer, the term of this patent is extended or adjusted under 35 U.S.C. 154(b) by 20 days.

(21) Appl. No.: 10/503,568

(22) PCT Filed: Jan. 31, 2003

(86) PCT No.: PCT/JP03/00971

§ 371 (c)(1),
(2), (4) Date: Aug. 5, 2004

(87) PCT Pub. No.: WO03/067358

PCT Pub. Date: Aug. 14, 2003

(65) Prior Publication Data

US 2005/0122090 A1    Jun. 9, 2005

(30) Foreign Application Priority Data

Feb. 6, 2002 (JP) .............................. 2002-029677

(51) Int. Cl.
*G05F 1/40* (2006.01)
*H05B 37/02* (2006.01)
(52) U.S. Cl. .................. 323/288; 315/225; 315/226
(58) Field of Classification Search ............... 315/224, 315/225, 226, 246, 291, 299, 306, 362; 323/220, 323/223, 265, 282, 288; G05F 1/40; H05B 37/02
See application file for complete search history.

(56) References Cited

U.S. PATENT DOCUMENTS

| 3,947,754 | A | * | 3/1976 | Wechsler | 323/300 |
| 4,139,723 | A |   | 2/1979 | Havas | 373/150 |
| 4,447,764 | A |   | 5/1984 | Komrumpf et al. | 315/240 |
| 4,447,765 | A |   | 5/1984 | Cote | 315/240 |
| 5,917,290 | A | * | 6/1999 | Shen et al. | 315/209 R |
| 5,959,440 | A | * | 9/1999 | Tobita et al. | 323/288 |

FOREIGN PATENT DOCUMENTS

| JP | 36-4331 | 4/1961 |
| JP | 52-6009 | 2/1977 |

(Continued)

*Primary Examiner*—Thuy Vinh Tran
(74) *Attorney, Agent, or Firm*—Rabin & Berdo, P.C.

(57) ABSTRACT

In a voltage source according to the present invention, a switching transistor (Q1) is turned on when the voltage of an electrolytic capacitor (C1) exceeds a predefined positive voltage level (E1), to keep the electrolytic capacitor (C1) at the predefined voltage level (E1), and turned off when the voltage of the electrolytic capacitor (C1) is reduced below the predefined voltage level (E1). A switching transistor (Q2) is turned on when the voltage of an electrolytic capacitor (C2) is reduced below a predefined negative voltage level (−E2), to keep the electrolytic capacitor (C2) at the predefined voltage level (−E2), and turned off when the voltage of the electrolytic capacitor (C2) exceeds the predefined voltage level (−E2). Therefore, an output voltage (V3) is controlled between the predefined voltage level (E1) as an upper limit and the predefined voltage level (−E2) as a lower limit.

3 Claims, 13 Drawing Sheets

FOREIGN PATENT DOCUMENTS

| | | |
|---|---|---|
| JP | 53-132749 | 11/1978 |
| JP | 56-139081 | 10/1981 |
| JP | 59-896 | 1/1984 |
| JP | 59-3892 | 1/1984 |
| JP | 63-55795 | 4/1988 |
| JP | 3-124782 | 12/1991 |
| JP | 4-28212 | 1/1992 |
| JP | 4-54513 | 2/1992 |
| JP | 4-87562 | 3/1992 |
| JP | 4-95106 | 3/1992 |
| JP | 4-356907 | 12/1992 |
| JP | 7-84656 | 3/1995 |
| JP | 9-237125 | 9/1997 |
| JP | 11-3785 | 1/1999 |
| JP | 11-187664 | 7/1999 |
| JP | 200-294391 | 10/2000 |
| JP | 2001-197742 | 7/2001 |
| JP | 2001-238444 | 8/2001 |
| JP | 2003-116277 | 4/2003 |

\* cited by examiner

FIG. 11
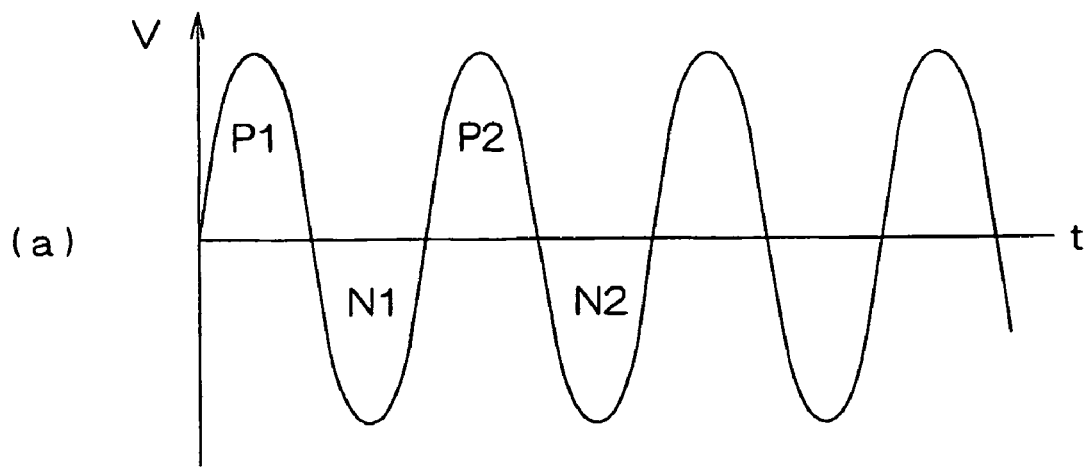
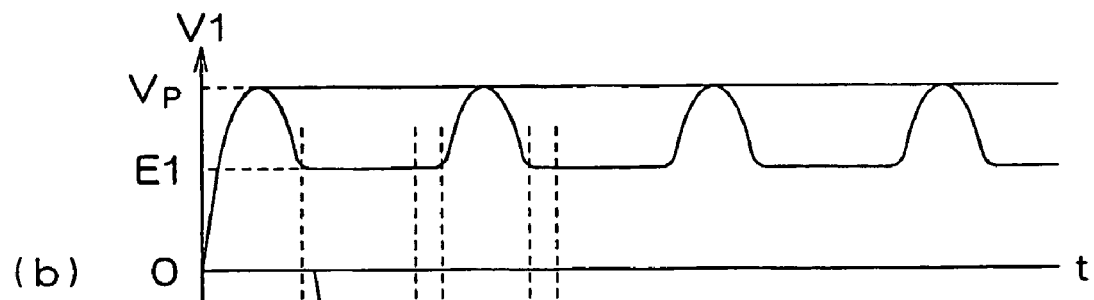
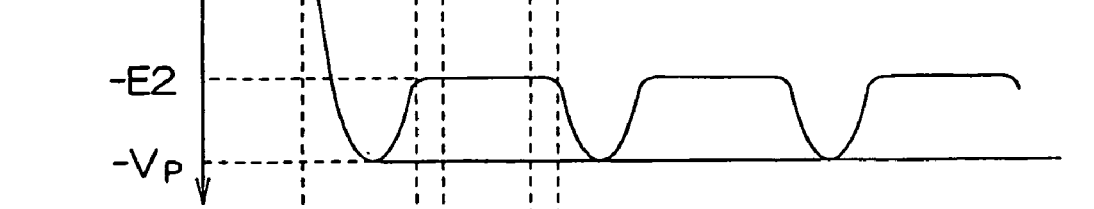
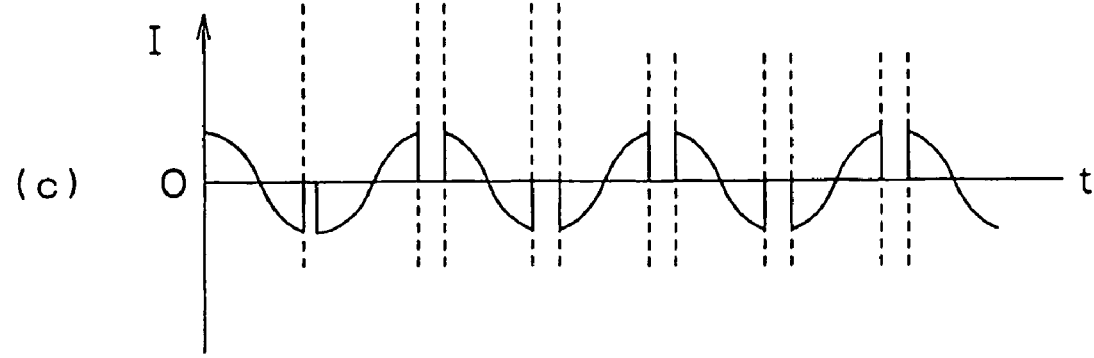

FIG. 13
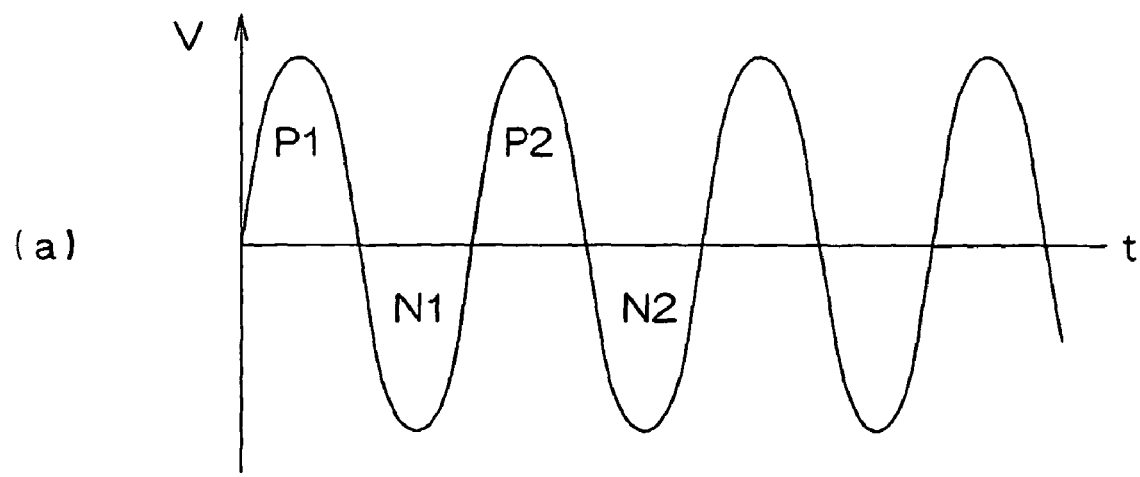
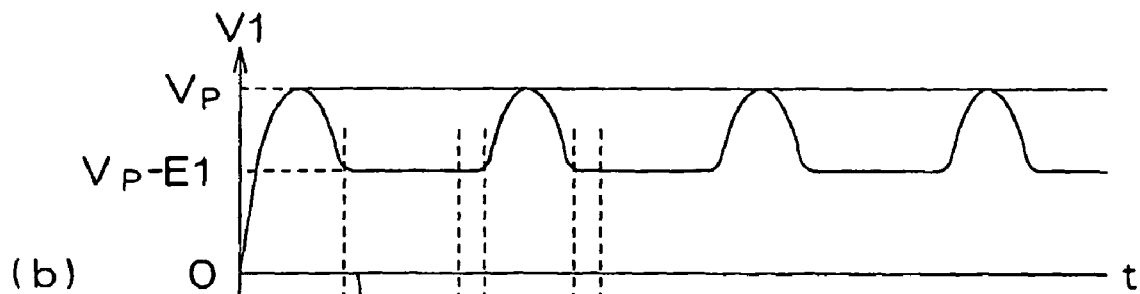
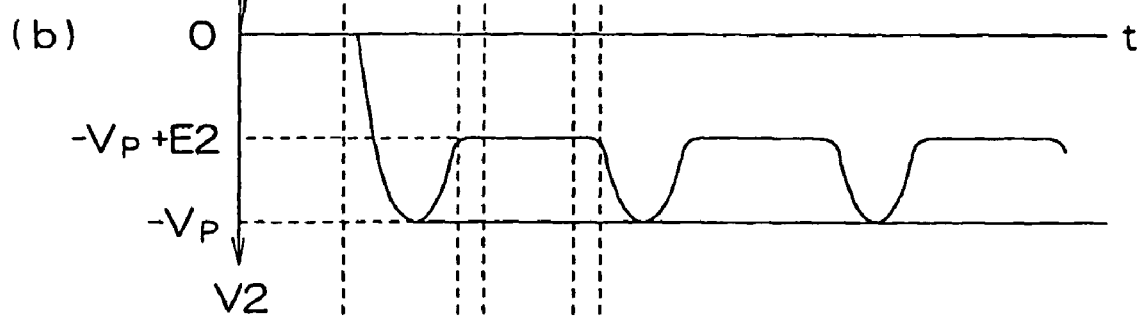
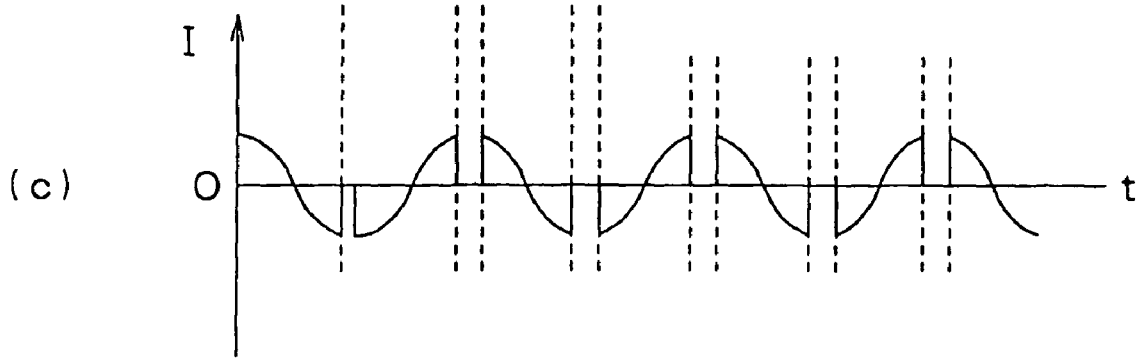

VOLTAGE SOURCE AND CURRENT SOURCE WITH CAPACITOR

CROSS REFERENCE TO RELATED APPLICATION

This application has been filed under 35 U.S.C. 371 based on PCT Application No. PCT/JP03/00971, filed Jan. 31, 2003, and the priority Patent Application No. 2002-029677 filed in Japan on Feb. 06, 2002.

TECHNICAL FIELD

The present invention relates to a voltage source capable of supplying a predetermined level of AC voltage and a current source capable of supplying a predetermined level of AC electric current.

BACKGROUND ART (A) Voltage sources are power supply apparatuses for supplying a predetermined level of AC voltage. Conventional voltage sources include those of an electromagnetic coil type and a capacitor division type.

The voltage sources of the electromagnetic coil type are disadvantageous for use as general-purpose equipment because of their heaviness and bulkiness.

The voltage sources of the capacitor division type have a drawback that a desired voltage ratio cannot be provided unless a capacitor having a high capacitance as compared with the capacitance of a load is employed. In use with an inductive load, the voltage sources may cause resonance unless a capacitor having a significantly high capacitance is employed.

It is therefore an object of the present invention to provide a light-weight and compact voltage source. It is another object of the invention to provide a voltage source in which a voltage can easily be set at any desired level.

(B) Conventional convenient-to-use current sources are of a type which includes an iron core and a coil inserted between a power source and a load. The current sources employing the iron core and the coil have a simple circuit configuration, but are disadvantageous because of their heaviness, bulkiness and greater heat loss.

A high frequency switching circuit may be employed for constructing a current source. However, the high frequency switching circuit deals with a frequency much higher than the commercial power source frequency, so that high frequency noises are radiated to adversely affect peripheral apparatuses.

Therefore, there is a demand for developing a current source capable of supplying an AC electric current by employing the commercial power source frequency on an "as is" basis.

If the current source is designed so that the electric current can variably be set at any desired level, the usefulness of the current source will be enhanced.

It is therefore further another object of the present invention to provide a light-weight and compact current source which has a simple construction including a switching element and a capacitor, and features reduced heat dissipation and no high frequency noise.

It is still another object of the present invention to provide a current source in which an electric current can easily be set at any desired level.

DISCLOSURE OF THE INVENTION (a) A voltage source according to one inventive aspect comprises, as shown in FIG. 1, a serial capacitor C connected in series between an AC power source V and a load, and a first voltage limiting circuit F1 and a second voltage limiting circuit F2 connected in parallel to the load. The first voltage limiting circuit F1 includes a first switching element S1 and a first capacitor C1 connected in series. The second voltage limiting circuit F2 includes a second switching element S2 and a second capacitor C2 connected in series. The first switching element S1 is constantly conductive to an electric current I1 flowing in one direction for charging the first capacitor C1 in a positive half cycle of the AC power source, and is controllably turned on and off for an electric current −I1 flowing in the other direction. When the voltage of the first capacitor C1 exceeds a predefined positive voltage level E1, the first switching element S1 is turned on to keep the first capacitor C1 at the predefined voltage level E1. When the voltage of the first capacitor C1 is reduced below the predefined voltage level E1, the first switching element S1 is turned off. The second switching element S2 is constantly conductive to an electric current I2 flowing in one direction for charging the second capacitor C2 in a negative half cycle of the AC power source, and is controllably turned on and off for an electric current −I2 flowing in the other direction. When the voltage of the second capacitor C2 is reduced below a predefined negative voltage level −E2, the second switching element S2 is turned on to keep the second capacitor C2 at the predefined voltage level −E2. When the voltage of the second capacitor C2 exceeds the predefined voltage level −E2, the second switching element S2 is turned off.

With the aforesaid arrangement, the first capacitor C1 is charged through the switching element S1 in the positive half cycle of the AC power source. When the voltage of the first capacitor C1 exceeds the predefined positive voltage level E1, the first switching element S1 is turned on for the reverse electric current −I1 to keep the voltage of the first capacitor C1 at the level E1. As a result, an output voltage is limited to a range below the voltage level E1 defined as an upper limit by the first voltage limiting circuit F1 in the positive half cycle.

In the negative half cycle of the AC power source, the second capacitor C2 is charged through the second switching element S2. When the voltage of the second capacitor C2 is reduced below the predefined negative voltage level −E2, the second switching element S2 is turned on for the reverse electric current −I2 to keep the voltage of the second capacitor C2 at the level −E2. As a result, the output voltage is limited to a range above the voltage level −E2 defined as a lower limit by the second voltage limiting circuit F2 in the negative half cycle.

Consequently, the output voltage is limited to a range between the voltage level E1 defined as the upper limit by the first voltage limiting circuit F1 and the voltage level −E2 defined as the lower limit by the second voltage limiting circuit F2 in a full wave cycle.

The voltage levels E1 and −E2 may be set in a continuously variable manner. Thus, a variable voltage source can be provided which allows for continuous voltage adjustment.

Where electrolytic capacitors which feature a higher capacitance/volume ratio are employed as the first capacitor C1 and the second capacitor C2, a compact voltage source can be provided by taking advantage of this feature. The electrolytic capacitors have polarities, and generally have a disadvantage that they cannot be used with alternating current. However, this disadvantage can be eliminated by permitting the first voltage limiting circuit F1 to operate in the positive half cycle of the AC power source and permitting the second voltage limiting circuit F2 to operate in the negative half cycle of the AC power source.

According to this inventive aspect, the output voltage can be set between the positive voltage level defined as the upper limit by the first voltage limiting circuit and the negative voltage level defined as the lower limit by the second voltage limiting circuit in the full wave cycle. These voltage limiting circuits can each easily be constructed by employing the voltage source, the switching element and the electrolytic capacitor, so that a small-size and light-weight voltage source can be provided.

(b) A current source according to another inventive aspect comprises, as shown in FIG. 4, a switching element S1 and a capacitor C1 connected in series between an AC power source V and a load. The switching element S1 is constantly conductive to an electric current I1 flowing in one direction for charging the capacitor C1 in a positive half cycle of the AC power source V, and is controllably turned on and off for an electric current −I1 flowing in the other direction. The switching element S1 is controlled to be turned on when a voltage between opposite terminals of the capacitor C1 is higher than a predefined voltage level E1, and to be turned off when the voltage of the capacitor C1 is not higher than the predefined voltage level E1.

It is assumed that the voltage of the load is negligibly small as compared with the voltage of the power source. With the aforesaid arrangement, the capacitor C1 is charged through the switching element S1 in the positive half cycle of the AC power source voltage V. When the AC voltage V starts decreasing from a peak value, the capacitor C1 starts discharging. However, when the voltage of the capacitor C1 is reduced to not higher than the predefined positive voltage level E1, the switching element S1 is turned off for the electric current −I1 flowing in the other direction to keep the voltage of the capacitor C1 at the level E1.

In the subsequent cycles, the capacitor C1 is charged and discharged only when the AC power source voltage V exceeds the predefined voltage level E1, and the voltage of the capacitor C1 is kept at the level E1 when the AC power source voltage V is reduced to not higher than the predefined voltage level E1.

A load electric current is determined by differentiating the voltage of the capacitor C1. The electric current occurs only when the capacitor C1 is charged and discharged. Since the charging and discharging of the capacitor C1 occur only when the AC power source voltage V exceeds the predefined voltage level E1, the electric current occurs only at this time. The level of the electric current varies as a function of the predefined voltage level E1. As the predefined voltage level E1 is reduced, the charging and discharging period of the capacitor C1 is increased and, hence, the electric current level is increased. As the predefined voltage level E1 is increased, the charging and discharging period of the capacitor C1 is reduced and, hence, the electric current level is reduced. Thus, the electric current level can be controlled by controlling the predefined voltage level E1.

Where the predefined voltage level E1 is continuously variable, a variable current source can be provided which allows for continuous setting.

Where an electrolytic capacitor which features a higher capacitance/volume ratio is employed as the capacitor C1, the current source has a compact structure by taking advantage of this feature. The electrolytic capacitor has polarities, and generally has a disadvantage that it cannot be used with alternating current. However, this disadvantage can be eliminated by preventing the voltage of the capacitor C1 from decreasing below the predefined voltage level E1.

(c) A current source according to further another inventive aspect comprises, as shown in FIG. 5, a switching element S2 and a capacitor C2 connected in series between an AC power source V and a load. The switching element S2 is constantly conductive to an electric current I2 flowing in one direction for charging the capacitor C2 in a negative half cycle of the AC power source V, and is controllably turned on and off for an electric current −I2 flowing in the other direction. The switching element S2 is controlled to be turned on when a voltage between opposite terminals of the capacitor C2 is lower than a predefined negative voltage level −E2, and to be turned off when the voltage of the capacitor C2 is not lower than the predefined voltage level −E2.

It is assumed that the voltage of the load is negligibly small as compared with the voltage of the power source. With the aforesaid arrangement, the capacitor C2 is charged through the switching element S2 in the negative half cycle of the AC power source voltage V. When the AC voltage V starts increasing from a negative peak value, the capacitor C2 starts discharging. However, when the voltage of the capacitor C2 is increased to not lower than the predefined negative voltage level −E2, the switching element S2 is turned off for the electric current −I2 flowing in the other direction to keep the voltage of the capacitor C2 at the level −E2.

In the subsequent cycles, the capacitor C2 is charged and discharged only when the AC power source voltage V is reduced below the predefined voltage level −E2. When the AC power source voltage V is increased to not lower than the predefined voltage level −E2, the voltage of the capacitor C2 is kept at the level −E2.

On the other hand, a load electric current is determined by differentiating the voltage of the capacitor C2. The electric current occurs only when the AC power source voltage V is lower than the predefined voltage level −E2. The level of the electric current varies as a function of the predefined voltage level −E2. As the absolute value of the predefined voltage level −E2 is reduced, the charging and discharging period of the capacitor C2 is increased and, hence, the electric current level is increased. As the absolute value of the predefined voltage level −E2 is increased, the charging and discharging period of the capacitor C2 is reduced and, hence, the electric current level is reduced. Thus, the electric current level can be controlled by controlling the predefined voltage level −E2.

Where the predefined voltage level −E2 is continuously variable, a variable current source can be provided which allows for continuous setting.

Where an electrolytic capacitor which features a higher capacitance/volume ratio is employed as the capacitor C2, the current source has a compact structure by taking advantage of this feature. The electrolytic capacitor has polarities, and generally has a disadvantage that it cannot be used with alternating current. However, this disadvantage can be eliminated by preventing the voltage of the capacitor C2 from increasing above the predefined voltage level −E2.

(d) A current source according to still another inventive aspect comprises, as shown in FIG. 6, a switching element S1 and a capacitor C1 connected in series between an AC power source V and a load, and a switching element S2 and a capacitor C2 connected in series between the AC power source V and the load.

The switching element S1 is constantly conductive to an electric current I1 flowing in one direction for charging the capacitor C1 in a positive half cycle of the AC power source V, and is controllably turned on and off for an electric current −I1 flowing in the other direction. The switching element S1 is controlled to be turned on when a voltage between opposite terminals of the capacitor C1 is higher than a predefined voltage level E1, and to be turned off when the voltage of the capacitor C1 is not higher than the predefined voltage level E1.

The switching element S2 is constantly conductive to an electric current I2 flowing in one direction for charging the capacitor C2 in a negative half cycle of the AC power source V, and is controllably turned on and off for an electric current −I2 flowing in the other direction. The switching element S2 is controlled to be turned on when a voltage between opposite terminals of the capacitor C2 is lower than a predefined negative voltage level −E2, and to be turned off when the voltage of the capacitor C2 is not lower than the predefined voltage level −E2.

This arrangement provides a full-wave type current source which employs the current source (b) and the current source (c) in combination. As a result, an output electric current is controlled on the basis of the predefined voltage level E1 in the positive half cycle, and controlled on the basis of the predefined voltage level −E2 in the negative half cycle.

The voltage levels E1 and −E2 may be set in a continuously variable manner. In this case, a variable current source can be provided which allows for continuous adjustment of the electric current.

Where electrolytic capacitors which feature a higher capacitance/volume ratio are employed as the capacitors C1 and C2, the current source has a compact structure by taking advantage of this feature. The electrolytic capacitors have polarities, and generally have a disadvantage that they cannot be used with alternating current. However, this disadvantage can be eliminated by keeping the voltage of the capacitor C1 at not lower than the predefined voltage level E1 and keeping the voltage of the capacitor C2 at not higher than the predefined voltage level −E2.

(e) A current source according to further another inventive aspect comprises, as shown in FIG. 7, a switching element S1 and a capacitor C1 connected in series between an AC power source V and a load, and a diode D1 and a reference capacitor C01 connected in series between the AC power source V and the load. The diode D1 has such an orientation that the reference capacitor C01 is charged in a positive half cycle of the AC power source V. The switching element S1 is constantly conductive to an electric current I1 flowing in one direction for charging the capacitor C1 in the positive half cycle of the AC power source V, and is controllably turned on and off for an electric current −I1 flowing in the other direction. The switching element S1 is controlled to be turned on when the voltage V1 of the capacitor C1 is higher than the sum of a peak value Vp of the power source voltage and a predefined negative voltage level −E1, and to be turned off when the voltage V1 of the capacitor C1 is not higher than the level Vp−E1.

With the aforesaid arrangement, the capacitor C1 is charged through the switching element S1 and the reference capacitor C01 is charged through the diode D1 in the positive half cycle of the AC power source voltage V. When the AC voltage V starts decreasing from the peak value, the capacitor C1 starts discharging. However, the reference capacitor C01 has no discharge circuit and, hence, does not discharge. Therefore, the voltage V01 of the reference capacitor C01 is kept at the peak value Vp of the AC voltage V. When the voltage V1 of the capacitor C1 is reduced to not higher than the sum Vp−E1 of the peak value Vp and the predefined voltage level −E1, the switching element S1 is turned off to keep the voltage V1 of the capacitor C1 at the level Vp−E1.

In the subsequent cycles, the capacitor C1 is charged and discharged when the AC power source voltage V is higher than the sum of the peak value Vp and the predefined voltage level −E1, i.e., when the following expression (1) is satisfied:

$$V > Vp - E1 \quad (1)$$

The voltage of the capacitor C1 is kept at the level Vp−E1 when the AC power source voltage V is not higher than the sum of the peak value Vp and the predefined voltage level −E1, i.e., when the following expression (2) is satisfied:

$$V \leq Vp - E1 \quad (2)$$

A load electric current is determined by differentiating the voltage of the capacitor C1. The electric current occurs only when the capacitor C1 is charged and discharged. Since the charging and discharging of the capacitor C1 occur when the AC power source voltage V satisfies the above expression (1), the electric current occurs at this time. The level of the electric current varies as a function of the predefined voltage level −E1. As the absolute value of the predefined voltage level −E1 is increased, the charging and discharging period of the capacitor C1 is increased and, hence, the electric current level is increased. As the absolute value of the predefined voltage level −E1 is reduced, the charging and discharging period of the capacitor C1 is reduced and, hence, the electric current level is reduced. Thus, the electric current level can be controlled by controlling the predefined voltage level −E1.

According to this inventive aspect, the reference capacitor C01 is additionally provided, and a voltage difference between the voltage V1 of the capacitor C1 and the voltage V01 of the reference capacitor C01 is utilized for the control. Therefore, the electric current level can stably be controlled even if the voltage VL of the load fluctuates.

Where the predefined voltage level −E1 is continuously variable, a variable current source can be provided which allows for continuous setting.

Where an electrolytic capacitor which features a higher capacitance/volume ratio is employed as the capacitor C1, the current source has a compact structure by taking advantage of this feature.

(f) A current source according to still another inventive aspect comprises, as shown in FIG. 8, a switching element S2 and a capacitor C2 connected in series between an AC power source V and a load, and a diode D2 and a reference capacitor C02 connected in series between the AC power source V and the load. The diode D2 has such an orientation that the reference capacitor C02 is charged in a negative half cycle of the AC power source V.

The switching element S2 is constantly conductive to an electric current I2 flowing in one direction for charging the capacitor C2 in the negative half cycle of the AC power source V, and is controllably turned on and off for an electric current −I2 flowing in the other direction. The switching element S2 is controlled to be turned on when the voltage V2 of the capacitor C2 is lower than the sum −Vp+E2 of a negative peak value −Vp of the power source voltage and a predefined voltage level E2, and to be turned off when the voltage V2 of the capacitor C2 is not lower than the level −Vp+E2.

A load voltage is represented by VL. With the aforesaid arrangement, the capacitor C2 is charged through the switching element S2 and the reference capacitor C02 is charged through the diode D2 in the negative half cycle of the AC power source voltage V. When the AC voltage V starts increasing from the peak value, the capacitor C2 starts discharging. However, the reference capacitor C02 has no discharge circuit. Therefore, the voltage V02 of the reference capacitor C02 is kept generally constant at the voltage level −Vp. When the voltage V2 of the capacitor C2 is increased to not lower than the level −Vp+E2, the switching element S2 is turned off to keep a differential voltage V2−V02 is kept at a level −E2. Therefore, the voltage V2 of the capacitor C2 is thereafter kept generally constant.

In the subsequent cycles, the capacitor C2 is charged when the power source voltage V is lower than the level −Vp+E2, i.e., when the following expression (3) is satisfied:

$$V < -Vp+E2 \quad (3)$$

The voltage of the capacitor C2 is kept at the level −Vp+E2 when the power source voltage V is not lower than the level −Vp+E2, i.e., when the following expression (4) is satisfied:

$$V \geq Vp+E1 \quad (4)$$

A load electric current is determined by differentiating the voltage of the capacitor C2. The electric current occurs only when the capacitor C2 is charged and discharged. Since the charging and discharging of the capacitor C2 occur when the AC power source voltage V satisfies the above expression (3), the electric current occurs at this time. The level of the electric current varies as a function of the predefined voltage level E2. As the absolute value of the predefined voltage level E2 is reduced, the charging and discharging period of the capacitor C2 is reduced and, hence, the electric current level is reduced. As the absolute value of the predefined voltage level E2 is increased, the charging and discharging period of the capacitor C2 is increased and, hence, the electric current level is increased. Thus, the electric current level can be controlled by controlling the predefined voltage level E2.

According to this inventive aspect, the reference capacitor C02 is additionally provided, and the voltage difference between the voltage V2 of the capacitor C2 and the voltage V02 of the reference capacitor C02 is utilized for the control. Therefore, the electric current level can stably be controlled even if the load voltage VL fluctuates.

Where the predefined voltage level E2 is continuously variable, a variable current source can be provided which allows for continuous setting.

Where an electrolytic capacitor which features a higher capacitance/volume ratio is employed as the capacitor C2, the current source has a compact structure by taking advantage of this feature.

(g) A current source according to further another inventive aspect comprises, as shown in FIG. 9, a switching element S1 and a capacitor C1 connected in series between an AC power source V and a load, and a diode D1 and a reference capacitor C01 connected in series between the AC power source V and the load. The diode D1 has such an orientation that the reference capacitor C01 is charged in a positive half cycle of the AC power source V. The current source further comprises a switching element S2 and a capacitor C2 connected in series between the AC power source V and the load, and a diode D2 and a reference capacitor C02 connected in series between the AC power source V and the load. The diode D2 has such an orientation that the reference capacitor C02 is charged in a negative half cycle of the AC power source V.

The switching element S1 is constantly conductive to an electric current I1 flowing in one direction for charging the capacitor C1 in the positive half cycle of the AC power source V, and is controllably turned on and off for an electric current −I1 flowing in the other direction. The switching element S1 is controlled to be turned on when the voltage of the capacitor C1 is higher than the sum Vp−E1 of a peak value Vp of the power source voltage and a predefined voltage level −E1, and to be turned off when the voltage of the capacitor C1 is not higher than the level Vp−E1. The switching element S2 is constantly conductive to an electric current I2 flowing in one direction for charging the capacitor C2 in the negative half cycle of the AC power source V, and is controllably turned on and off for an electric current −I2 flowing in the other direction. The switching element S2 is controlled to be turned on when the voltage V2 of the capacitor C2 is lower than the sum −Vp+E2 of a negative peak value −Vp of the power source voltage and a predefined voltage level E2, and to be turned off when the voltage V2 of the capacitor C2 is not lower than the level −Vp+E2.

This arrangement provides a full-wave type current source which employs the current source (e) and the current source (f) in combination. As a result, an output electric current is controlled on the basis of the predefined voltage level −E1 in the positive half cycle, and controlled on the basis of the predefined voltage level E2 in the negative half cycle.

The voltage levels −E1 and E2 may be set in a continuously variable manner. In this case, a variable current source can be provided which allows for continuous adjustment of the electric current.

Where electrolytic capacitors which feature a higher capacitance/volume ratio are employed as the capacitors C1 and C2, the current source has a compact structure by taking advantage of this feature.

BRIEF DESCRIPTION OF THE DRAWINGS

FIGS. 11(*a*) to 11(*c*) are waveform diagrams of the voltage V of a power source, the voltage V1 of an electrolytic capacitor C1, the voltage V2 of an electrolytic capacitor C2 and an output current I;

FIGS. 13(*a*) to 13(*c*) are waveform diagrams of the voltage V of a power source, the voltage V1 of an electrolytic capacitor C1, the voltage V2 of an electrolytic capacitor C2 and an output current I.

BEST MODE FOR CARRYING OUT THE INVENTION

Embodiments of the present invention will hereinafter be described in detail with reference to the attached drawings.

(1) FIRST EMBODIMENT

Figure 1:
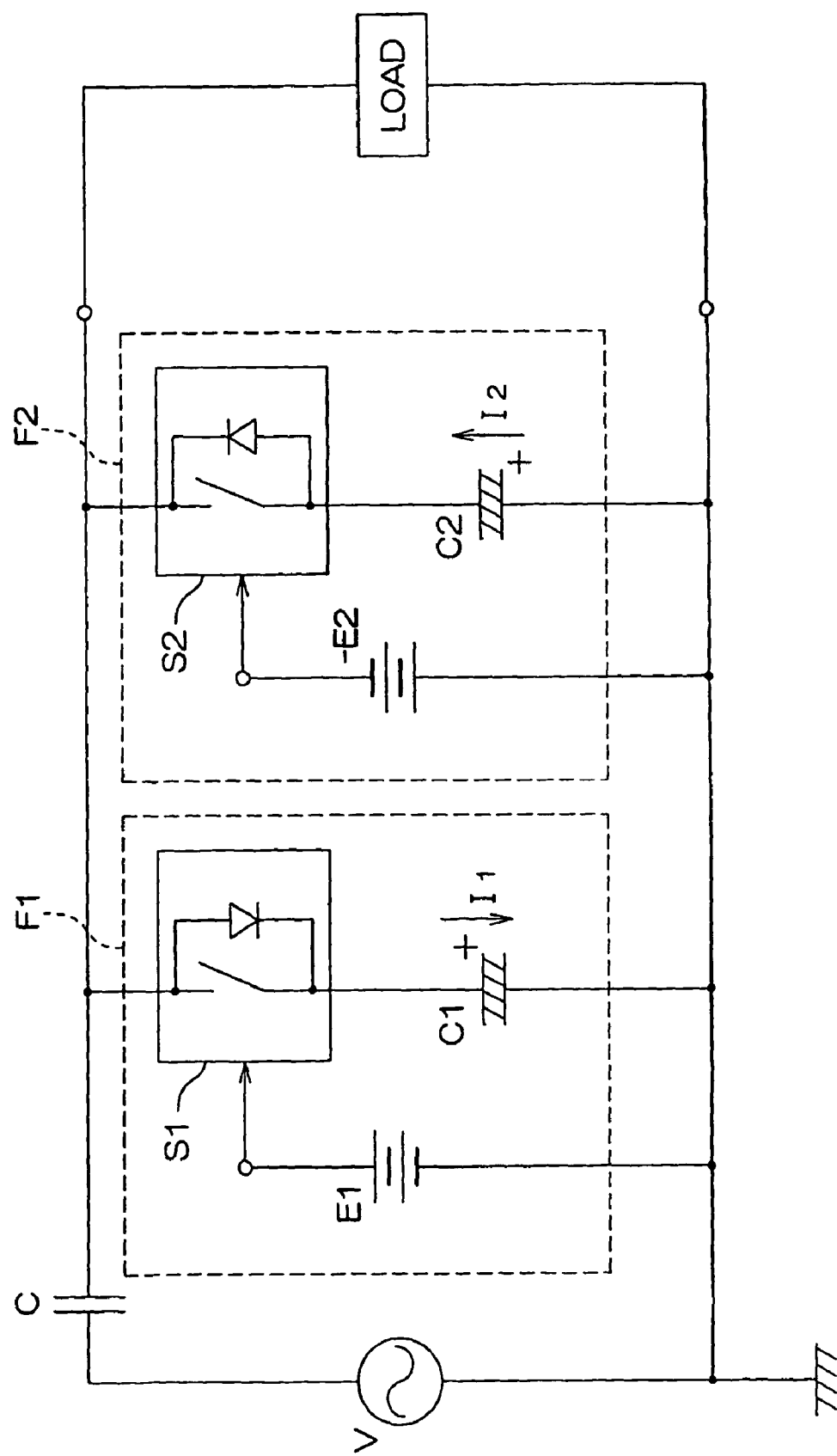
FIG. 1 is a circuit configuration diagram for explaining the principle of a voltage source according to the present invention.
Figure 2:
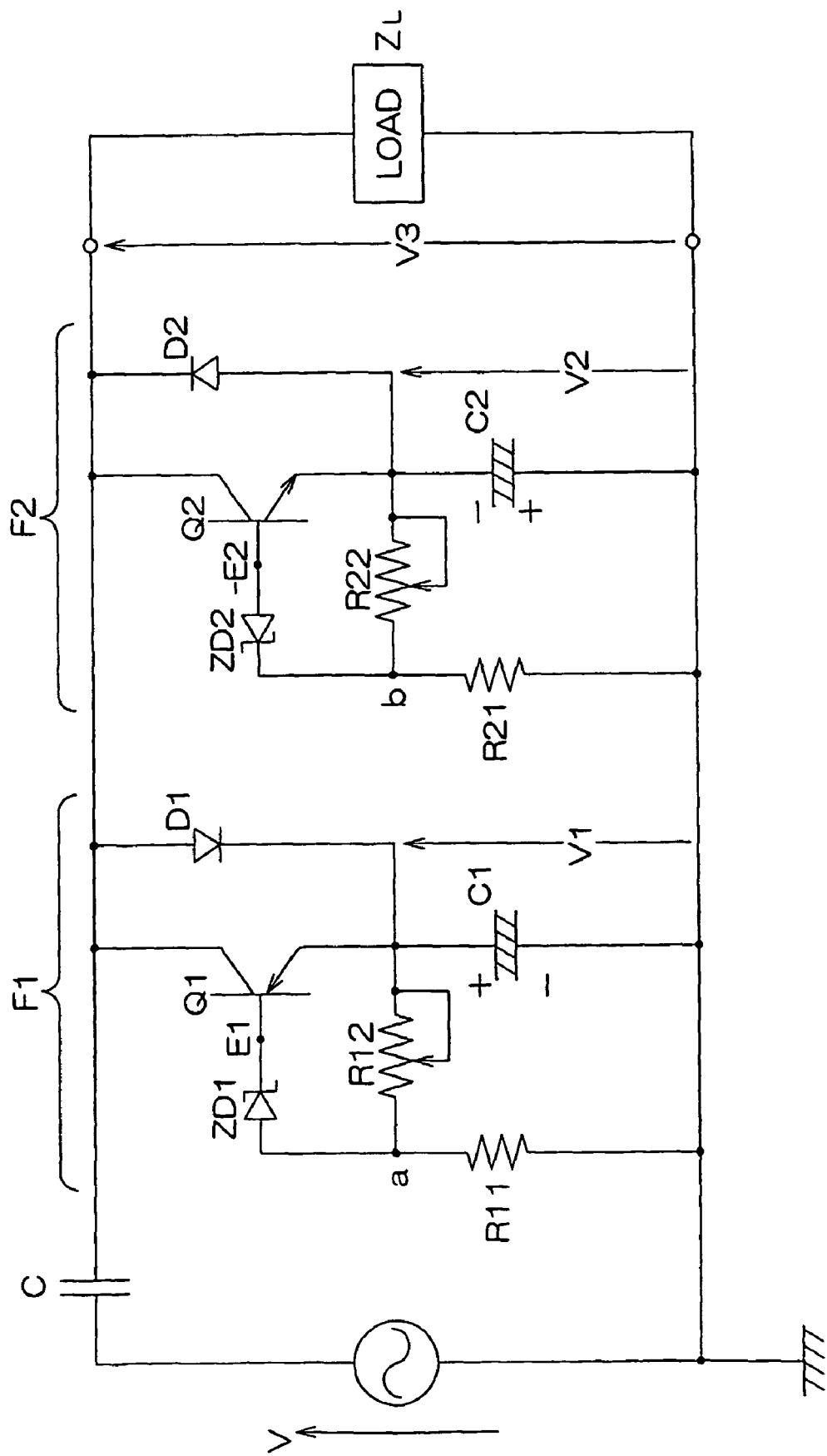
FIG. 2 is a more specific circuit diagram of the voltage source according to the invention.

FIG. 2 is a circuit diagram of a variable voltage source (full wave type) according to the present invention.

A capacitor C is connected in series to an AC power source. A first voltage limiting circuit F1 and a second voltage limiting circuit F2 are connected in parallel on an output side of the capacitor C, and connected to output terminals. A load ZL is connected to the output terminals.

The first voltage limiting circuit F1 is adapted to limit a voltage in a positive half cycle, and includes a switching transistor Q1 and an electrolytic capacitor C1 connected in series. The switching transistor Q1 has polarities such that its collector is connected to the capacitor C and its emitter is connected to the electrolytic capacitor C1. A diode D1 is connected in parallel to the switching transistor Q1 between the emitter and collector of the switching transistor Q1. The other terminal of the electrolytic capacitor C1 is grounded. A constant voltage diode ZD1 is connected between a base of the switching transistor Q1 and a resistor division point a. At this resistor division point a, resistors R11 and R12 connected in parallel to the electrolytic capacitor C1 are connected to each other. The resistor R12 is continuously variable.

The second voltage limiting circuit F2 is adapted to limit a voltage in a negative half cycle, and includes a switching transistor Q2 and an electrolytic capacitor C2 connected in series. The switching transistor Q2 has polarities such that its collector is connected to the capacitor C and its emitter is connected to the electrolytic capacitor C2. A diode D2 is connected in parallel to the switching transistor Q2 between the emitter and collector of the switching transistor Q2. The other terminal of the electrolytic capacitor C2 is grounded. A constant voltage diode ZD2 is connected between a base of the switching transistor Q2 and a resistor division point b. At this resistor division point b, resistors R21 and R22 connected in parallel to the electrolytic capacitor C2 are connected to each other. The resistor R22 is continuously variable.

The switching transistors Q1 and Q2 are a PNP transistor and an NPN transistor, respectively. The electrolytic capacitor C1 is connected to the switching transistor Q1 at its positive terminal, while the electrolytic capacitor C2 is connected to the switching transistor Q2 at its negative terminal. The diode D1 is connected in such an orientation that the electrolytic capacitor C1 is charged in the positive half cycle, while the diode D2 is connected in such an orientation that the electrolytic capacitor C2 is charged in the negative half cycle. The constant voltage diode ZD1 is connected to the base of the switching transistor Q1 at its positive terminal, while the constant voltage diode ZD2 is connected to the base of the switching transistor Q2 at its negative terminal. The voltage of the positive terminal of the constant voltage diode ZD1 is represented by E1, and the voltage of the negative terminal of the constant voltage diode ZD2 is represented by –E2. The voltage levels E1 and –E2 can be set in a continuously variable manner by the resistors R12 and R22, respectively.

In the aforesaid circuit, the capacitor C, the electrolytic capacitor C1 and the electrolytic capacitor C2 have device constants of, for example, C=20 μF, C1=100 μF and C2=100 μF, respectively.

Next, an explanation will be given to the operation of the aforesaid variable voltage source.

Figure 3:
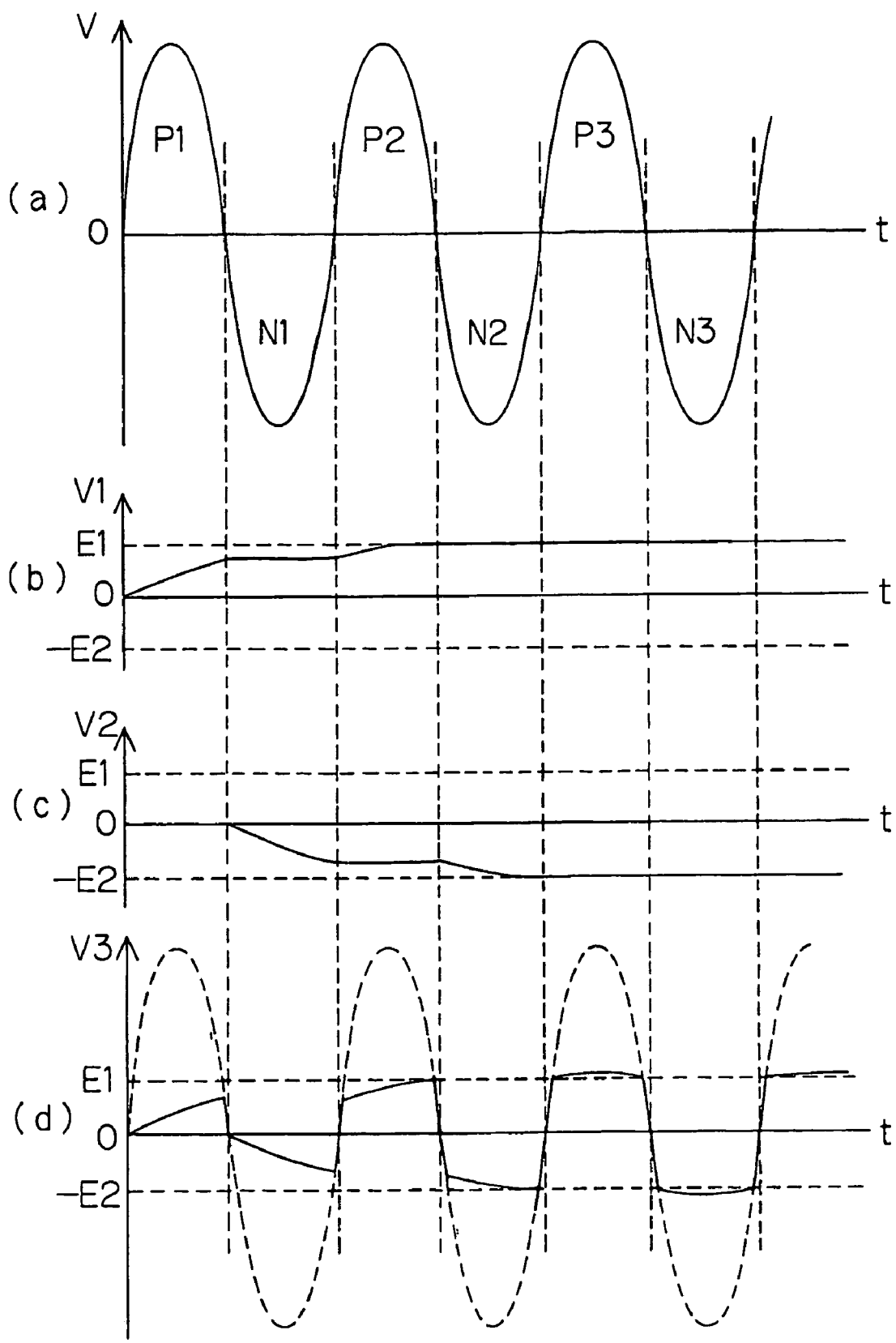
FIGS. 3(a) to 3(d) are waveform diagrams of the voltage V of a power source, the voltage V1 of an electrolytic capacitor C1, the voltage V2 of an electrolytic capacitor C2 and an output voltage V3.
Figure 4:
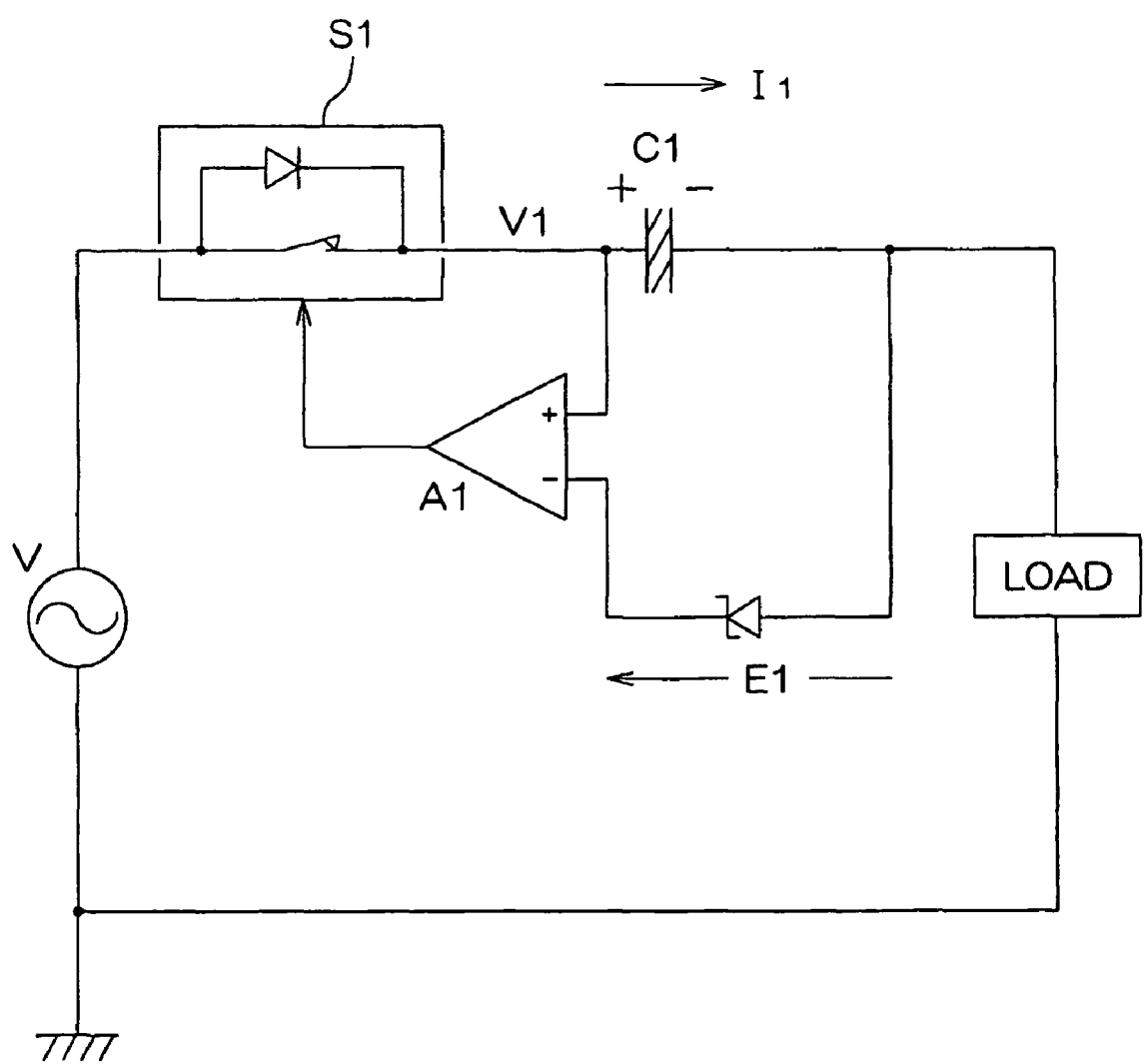
FIG. 4 is a circuit configuration diagram for explaining the principle of a current source (half wave type) according to the invention.
Figure 5:
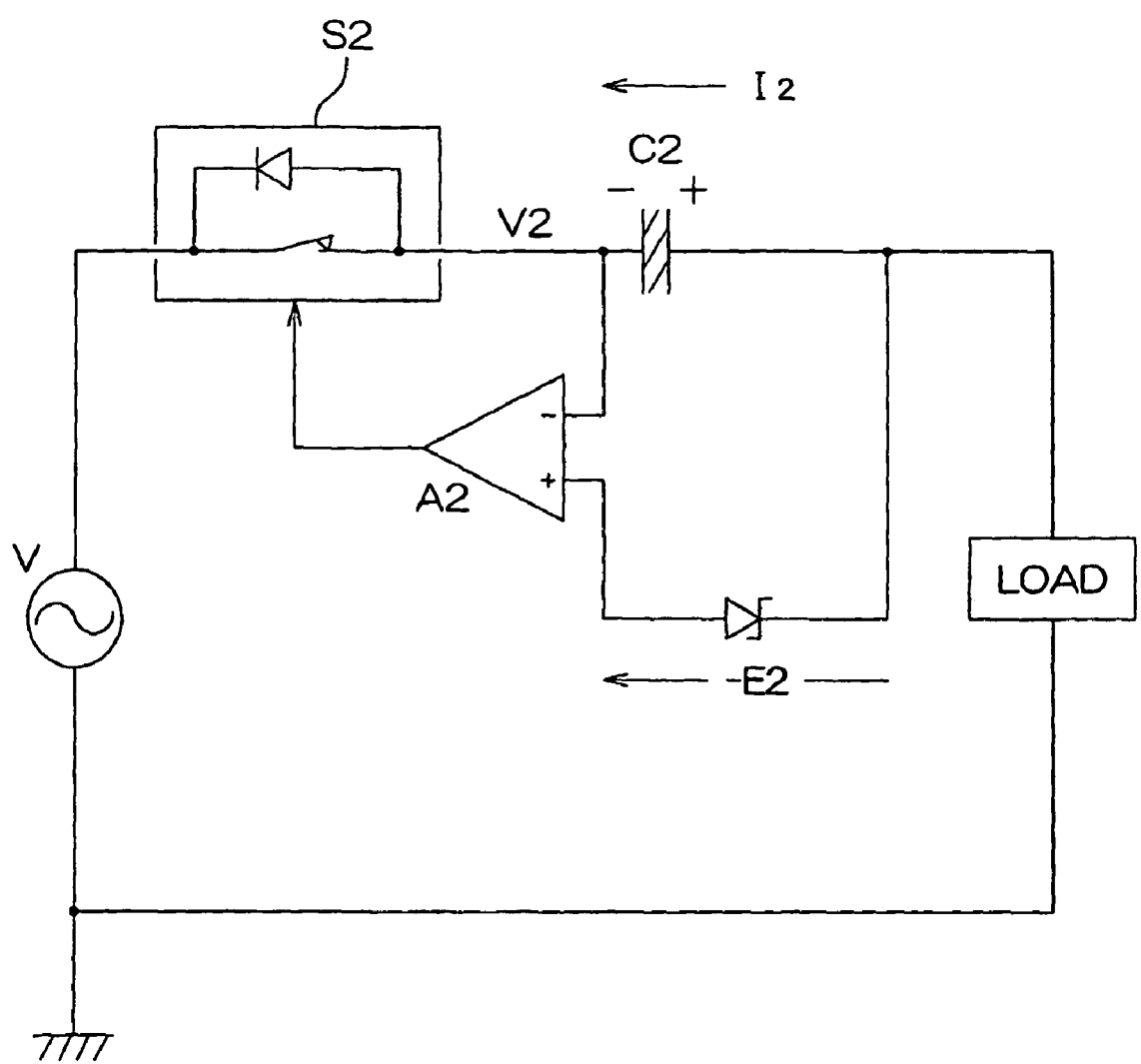
FIG. 5 is a circuit configuration diagram for explaining the principle of another current source (half wave type) according to the invention.
Figure 6:
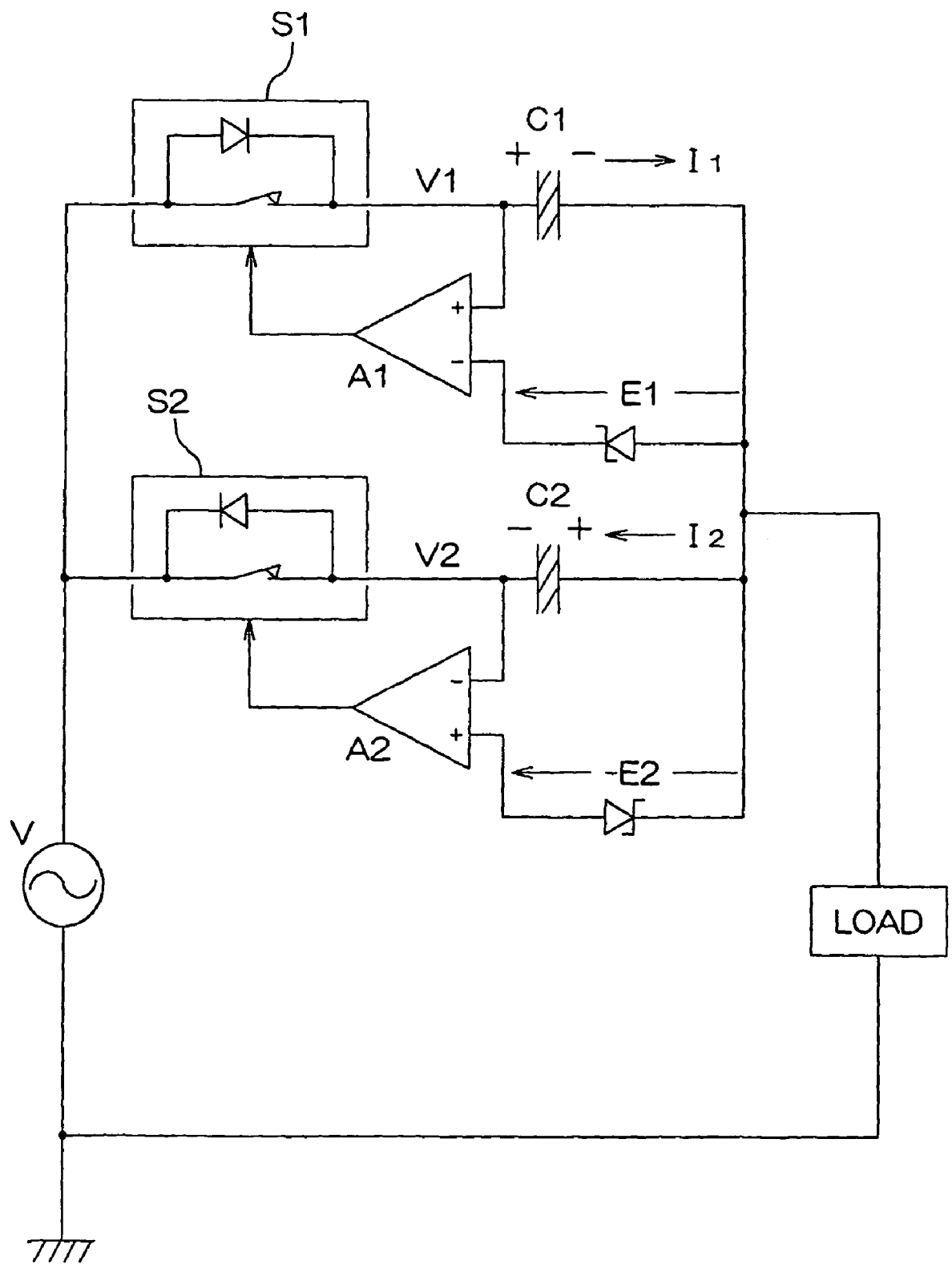
FIG. 6 is a circuit configuration diagram for explaining the principle of further another current source (full wave type) according to the invention.
Figure 7:
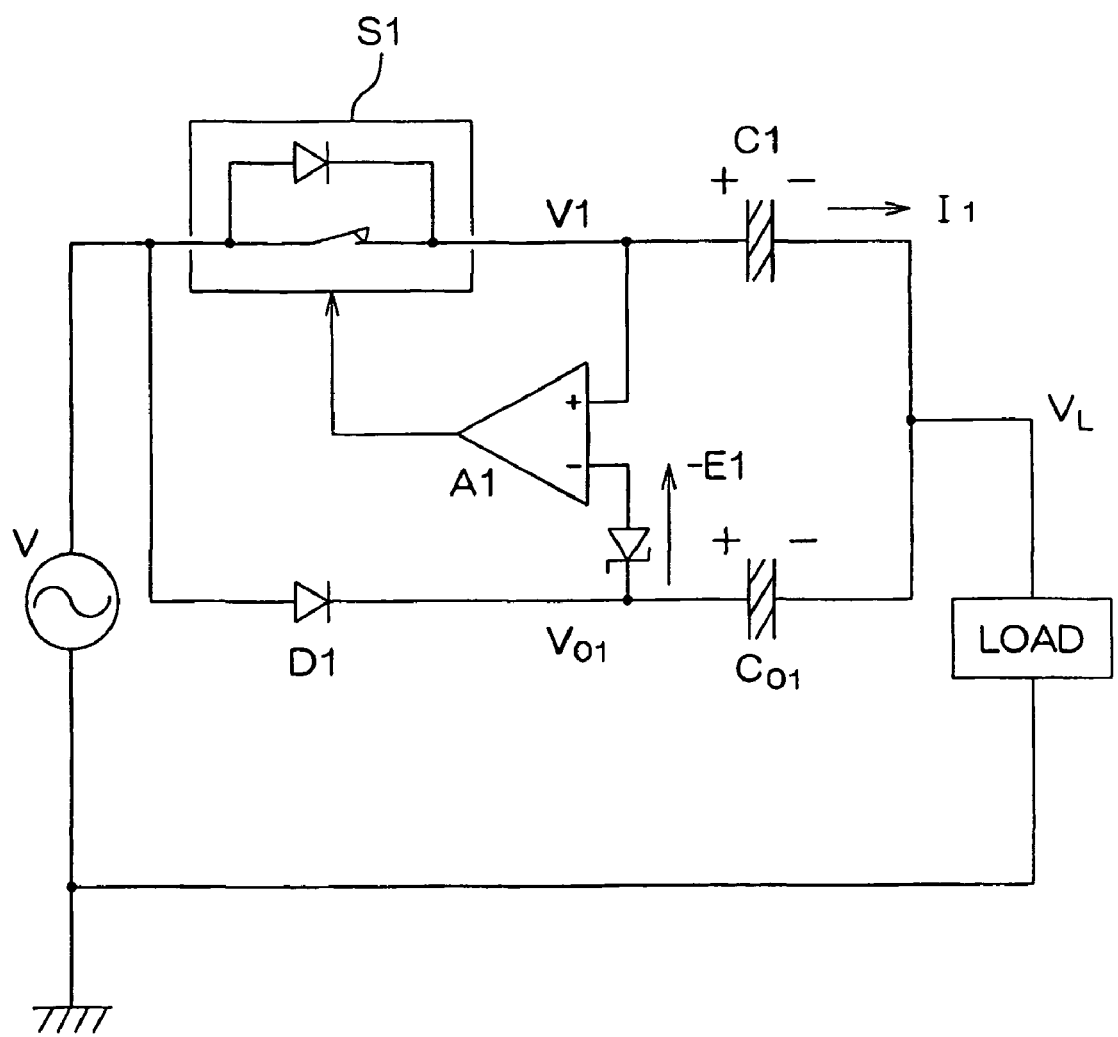
FIG. 7 is a circuit configuration diagram for explaining the principle of still another current source (half wave type) employing a reference capacitor according to the invention.
Figure 8:
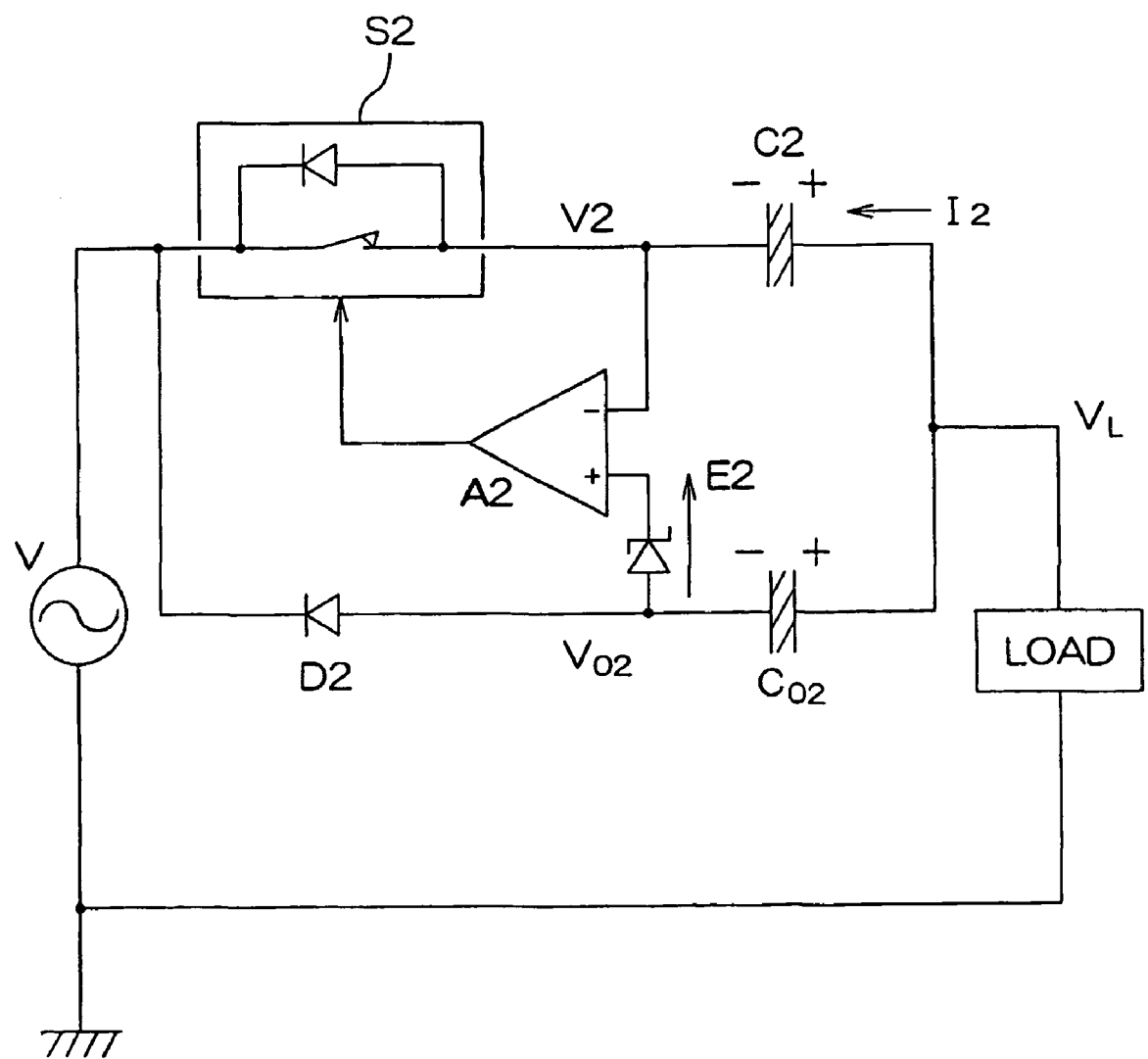
FIG. 8 is a circuit configuration diagram for explaining the principle of further another current source (half wave type) employing a reference capacitor according to the invention.
Figure 9:
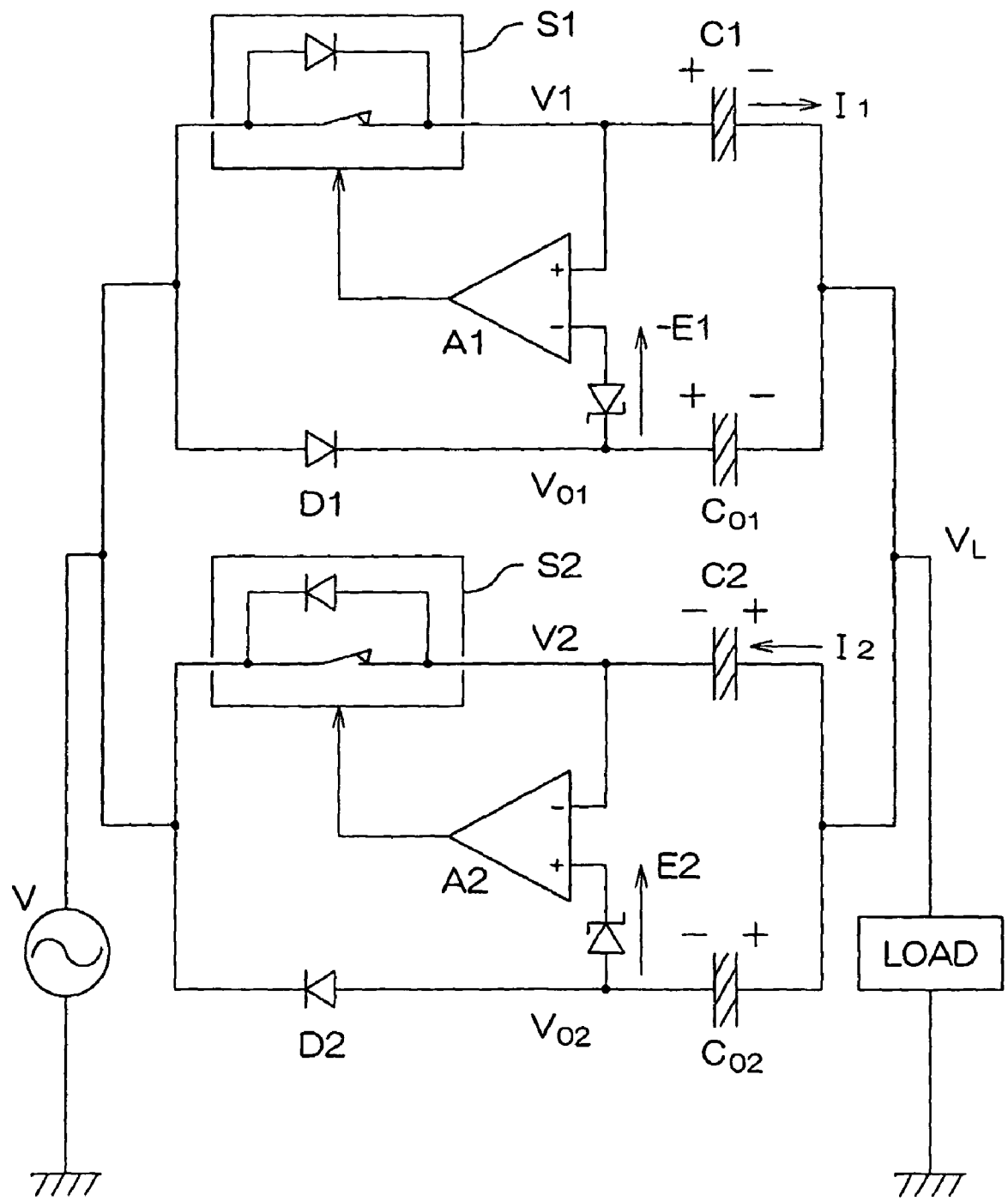
FIG. 9 is a circuit configuration diagram for explaining the principle of still another current source (full wave type) employing a reference capacitor according to the invention.

FIGS. 3(*a*) to 3(*d*) are waveform diagrams of a power source voltage V, a voltage V1 between the opposite terminals of the electrolytic capacitor C1, a voltage V2 between the opposite terminals of the electrolytic capacitor C2 and an output voltage V3 between the output terminals (referred to simply as "output voltage"). A reference character t on the abscissa denotes time. The positive half cycles of the power source voltage V are represented by P1, P2 and the like, and the negative half cycles of the power source voltage V are represented by N1, N2 and the like.

It is assumed that the power source is turned on at a time point t=0. The charging of the electrolytic capacitor C1 through the diode D1 is started in the first positive half cycle P1. The charging time constant of the electric capacitor C1 is set relatively great, so that the voltage V1 of the electrolytic capacitor C1 does not reach the voltage level E1 in the positive half cycle P1. The output voltage V3 has the same waveform as the voltage V1 of the electrolytic capacitor C1 (see FIGS. 3(*b*) and 3(*d*)).

In the negative half cycle N1, the electrolytic capacitor C2 is charged through the diode D2. In this case, also, the voltage V2 of the electrolytic capacitor C2 does not reach the voltage level –E2 in the negative half cycle N1. The output voltage V3 has the same waveform as the voltage V2 of the electrolytic capacitor C2 (see FIGS. 3(*c*) and 3(*d*)).

In each of the subsequent several positive half cycles, the charging of the electrolytic capacitor C1 is resumed. In one of these half cycles, the voltage V1 of the electrolytic capacitor C1 reaches the voltage level E1. At this time point, electrical continuity is established between the base and emitter of the switching transistor Q1, so that the switching transistor Q1 is turned on. Thus, the voltage V1 of the electrolytic capacitor C1 is kept at the predefined voltage level E1. The predefined voltage level E1 is the upper limit of the collector voltage of the switching transistor Q1, i.e., the output voltage V3.

In each of the subsequent negative half cycles, the charging of the electrolytic capacitor C2 is resumed. In the midst of these half cycles, the voltage V2 of the electrolytic capacitor C2 reaches the voltage level –E2. At this time point, electrical continuity is established between the base and emitter of the switching transistor Q2, so that the switching transistor Q2 is turned on. Thus, the voltage V2 of the electrolytic capacitor C2 is kept at the predefined voltage level −E2. The predefined voltage level −E2 is the lower limit of the collector voltage of the switching transistor Q2, i.e., the output voltage V3.

In the constant state cycles, the output voltage V3 alternately oscillates between the predefined voltage level E1 as the upper limit and the predefined voltage level −E2 as the lower limit.

In this way, the upper and lower limits of the power source voltage V can be defined. The upper limit voltage level and the lower limit voltage level are determined by adjusting the resistors R12 and R22 or by setting the breakdown voltages of the constant voltage diodes ZD1 and ZD2.

While the voltage source of the present invention has thus been described by way of the embodiment thereof, the invention is not limited to this embodiment. For example, a half-wave type voltage source can be provided by employing either the first voltage limiting circuit F1 or the second voltage limiting circuit F2 shown in FIG. 2.

(2) SECOND EMBODIMENT

Figure 10:
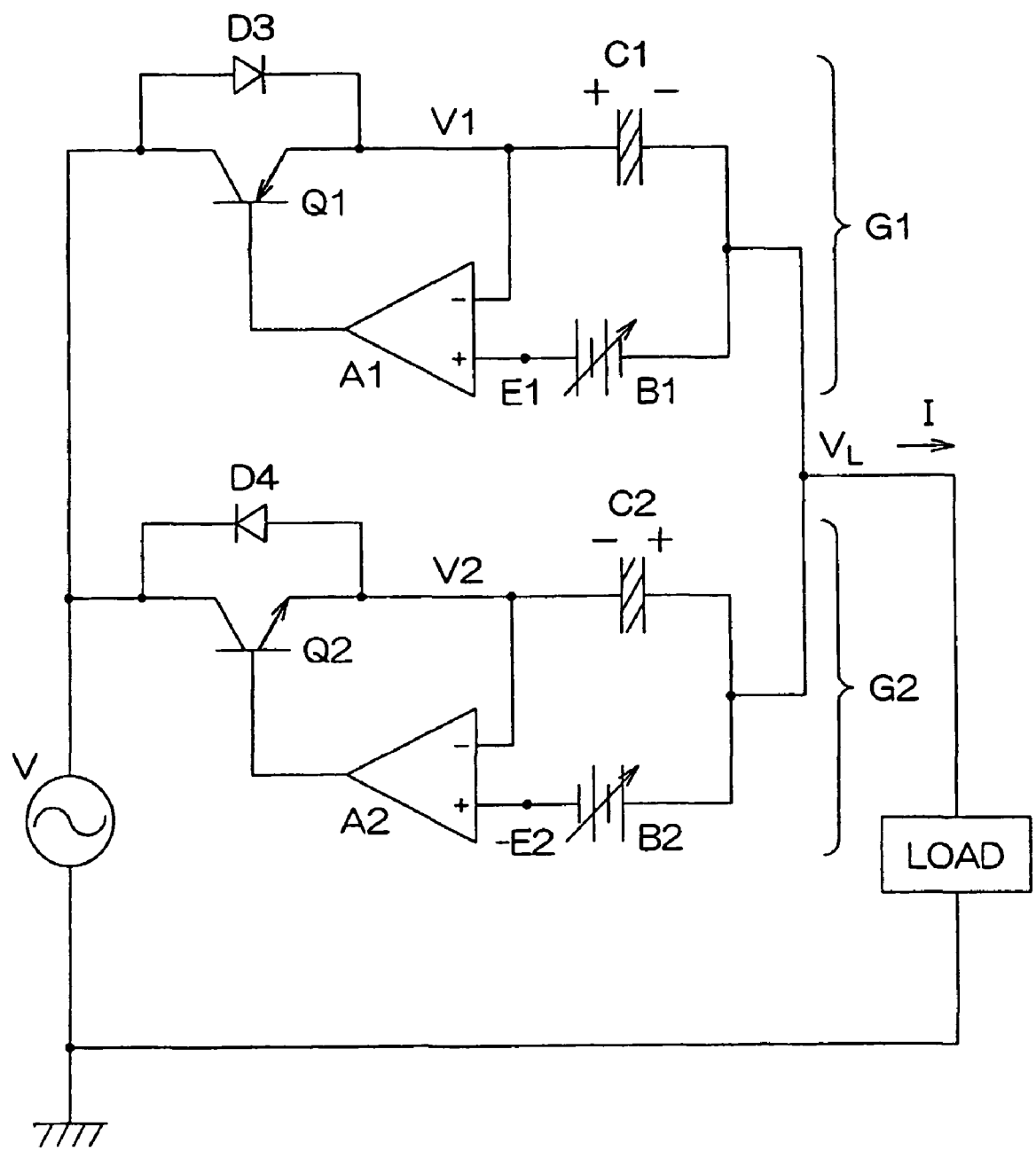
FIG. 10 is a circuit configuration diagram of a current source (full wave type) according to an embodiment of the present invention.

FIG. 10 is a circuit diagram of a variable current source (full wave type) according to the present invention.

Two variable current circuits (a positive half-wave variable current circuit G1 and a negative half-wave variable current circuit G2) are connected in parallel between an AC power source V and a load.

The positive half-wave variable current circuit G1 is adapted to limit an electric current in a positive half cycle, and includes a switching transistor Q1 and an electrolytic capacitor C1 connected in series. The switching transistor Q1 has polarities such that its collector is connected to the AC power source V and its emitter is connected to the electrolytic capacitor C1. A diode D3 is connected in parallel to the switching transistor Q1 between the collector and emitter of the switching transistor Q1. One terminal of a voltage source B1 is connected to a terminal of the electrolytic capacitor C1 on a load side, and a voltage comparator A1 is connected between the other terminal of the voltage source B1 and the electrolytic capacitor C1. A comparison output of the voltage comparator A1 is connected to a base of the switching transistor Q1.

The negative half-wave variable current circuit G2 is adapted to limit an electric current in a negative half cycle, and includes a switching transistor Q2 and an electrolytic capacitor C2 connected in series. The switching transistor Q2 has polarities such that its collector is connected to the AC power source V and its emitter is connected to the electrolytic capacitor C2. A diode D4 is connected in parallel to the switching transistor Q2 between the collector and emitter of the switching transistor Q2. One terminal of a voltage source B2 is connected to a terminal of the electrolytic capacitor C2 on a load side, and a voltage comparator A2 is connected between the other terminal of the voltage source B2 and the other terminal of the electrolytic capacitor C2. A comparison output of the voltage comparator A2 is connected to a base of the switching transistor Q2.

The switching transistors Q1 and Q2 are a PNP transistor and an NPN transistor, respectively. The electrolytic capacitor C1 is connected to the load at its negative terminal, and to the switching transistor Q1 at its positive terminal. The electrolytic capacitor C2 is connected to the load at its positive terminal, and to the switching transistor Q2 at its negative terminal. The diode D3 is connected in such an orientation that the electrolytic capacitor C1 is charged in the positive half cycle, while the diode D4 is connected in such an orientation that the electrolytic capacitor C2 is charged in the negative half cycle. The voltage source B1 is connected to the voltage comparator A1 at its positive terminal, and the voltage source B2 is connected to the voltage comparator A2 at its negative terminal. The voltage comparator A1 applies a positive output to the base of the switching transistor Q1 when the voltage V1 of the electrolytic capacitor C1 is reduced below the voltage E1 of the voltage source B1. The voltage comparator A2 applies a negative output to the base of the switching transistor Q2 when the voltage V2 of the electrolytic capacitor C2 is increased above the voltage −E2 of the voltage source B2.

The voltage level E1 of the voltage source B1 and the voltage level −E2 of the voltage source B2 can each be set in a continuously or discretely variable manner by known means such as a constant voltage diode and a resistor division circuit not shown.

Next, an explanation will be given to the operation of the aforesaid variable current source.

FIGS. 11(a) to 11(c) are waveform diagrams of the voltage V of the power source, the voltage V1 of the electrolytic capacitor C1, the voltage V2 of the electrolytic capacitor C2 and an output current I. A reference character t on the abscissa denotes time. The positive half cycles of the power source voltage V are represented by P1, P2 and the like, and the negative half cycles of the power source voltage V are represented by N1, N2 and the like.

It is assumed that the power source is turned on at a time point t=0. The charging of the electrolytic capacitor C1 through the diode D3 is started in the first positive half cycle P1. The power source voltage V reaches a peak value Vp, and then starts decreasing from the peak value Vp. When the power source voltage V reaches the voltage level E1, the switching transistor Q1 is turned off by the operation of the voltage comparator A1. The electrolytic capacitor C1 stops discharging, and its voltage is kept at the level E1.

In the negative half cycle N1, the electrolytic capacitor C2 is charged through the diode D4. The power source voltage V reaches a peak value −Vp, and then starts increasing from the peak value −Vp. When the power source voltage V reaches the voltage level −E2, the switching transistor Q2 is turned off by the operation of the voltage comparator A2. The electrolytic capacitor C2 stops discharging, and its voltage is kept at the level −E2.

When the power source voltage V exceeds the voltage level E1 in the midst of the next positive half cycle P2, the charging of the electrolytic capacitor C1 is resumed.

When the power source voltage V is reduced below the voltage level −E2 in the midst of the next negative half cycle N2, the charging of the electrolytic capacitor C2 is resumed.

In this way, the charging and discharging of the electrolytic capacitors C1 and C2 are carried out only when the power source voltage V is higher than the voltage level E1 and is lower than the voltage level −E2. The electric current I flows when the electrolytic capacitors C1 and C2 are charged and discharged as shown in FIG. 11(c). The level of the electric current I is determined by the settings of the voltage levels E1 and −E2. By variably setting the voltage levels E1 and −E2, the electric current level I is varied.

(3) THIRD EMBODIMENT

Figure 12:
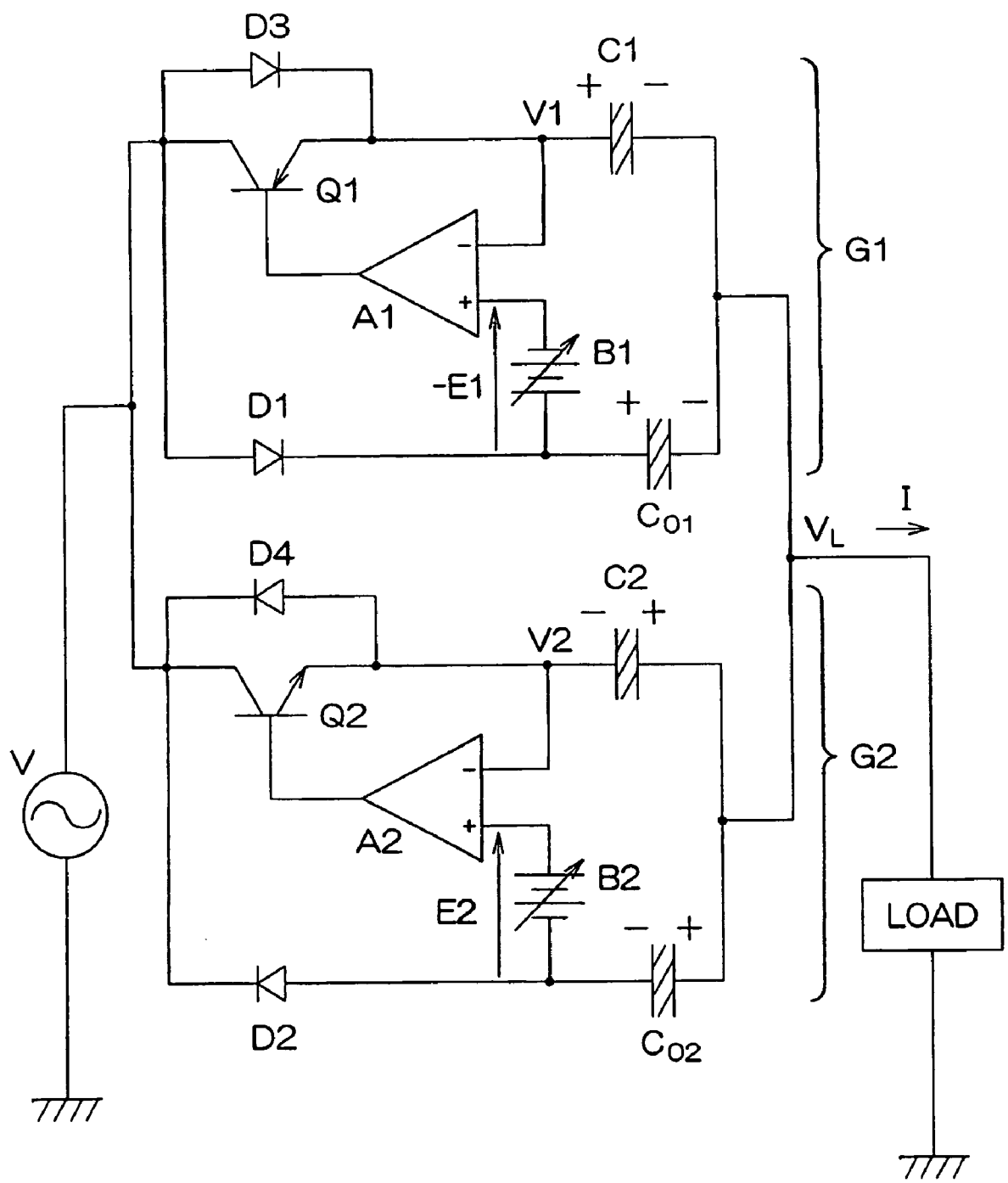
FIG. 12 is a circuit configuration diagram of a current source (full wave type) employing a reference capacitor according to another embodiment of the invention.

FIG. 12 is a circuit diagram of a variable current source (full wave type) according to the present invention.

Two variable current circuits (a positive half-wave variable current circuit G1 and a negative half-wave variable current circuit G2) are connected in parallel between an AC power source V and a load.

The positive half-wave variable current circuit G1 is adapted to limit an electric current in a positive half cycle, and includes a switching transistor Q1 and an electrolytic capacitor C1 connected in series. The switching transistor Q1 has polarities such that its collector is connected to the AC power source V and its emitter is connected to the electrolytic capacitor C1. A diode D3 is connected in parallel to the switching transistor Q1 between the collector and emitter of the switching transistor Q1. Further, a terminal of the electrolytic capacitor C1 on a load side is connected to a reference electrolytic capacitor C01 and a voltage source B1, and a voltage comparator A1 is connected between the other terminal of the voltage source B1 and the electrolytic capacitor C1. A comparison output of the voltage comparator A1 is connected to a base of the switching transistor Q1.

The negative half-wave variable current circuit is adapted to limit an electric current in a negative half cycle, and includes a switching transistor Q2 and an electrolytic capacitor C2 connected in series. The switching transistor Q2 has polarities such that its collector is connected to the AC power source V and its emitter is connected to the electrolytic capacitor C2. A diode D4 is connected in parallel to the switching transistor Q2 between the collector and emitter of the switching transistor Q2. A terminal of the electrolytic capacitor C2 on a load side is connected to a reference electrolytic capacitor C02 and a voltage source B2, and a voltage comparator A2 is connected between the other terminal of the voltage source B2 and the electrolytic capacitor C2. A comparison output of the voltage comparator A2 is connected to a base of the switching transistor Q2.

The switching transistors Q1 and Q2 are a PNP transistor and an NPN transistor, respectively. The electrolytic capacitor C1 and the electrolytic capacitor C01 are connected to the load at their negative terminals. The electrolytic capacitor C2 and the electrolytic capacitor C02 are connected to the load at their positive terminals. The diode D3 is connected in such an orientation that the electrolytic capacitor C1 is charged in the positive half cycle, while the diode D4 is connected in such an orientation that the electrolytic capacitor C2 is charged in the negative half cycle. The voltage source B1 is connected to the voltage comparator A1 at its negative terminal, and the voltage source B2 is connected to the voltage comparator A2 at its positive terminal. The voltage comparator A1 applies a positive output to the base of the switching transistor Q1 when the voltage V1 of the electrolytic capacitor C1 is reduced below a voltage level at a terminal of the voltage comparator A1 connected to the voltage source B1. The voltage comparator A2 applies a negative output to the base of the switching transistor Q2 when the voltage V2 of the electrolytic capacitor C2 is increased above a voltage level at a terminal of the voltage comparator A2 connected to the voltage source B2.

The voltage level −E1 of the voltage source B1 and the voltage level E2 of the voltage source B2 can each be set in a continuously or discretely variable manner by known means such as a constant voltage diode and a resistor division circuit not shown.

Next, an explanation will be given to the operation of the aforesaid variable current source.

FIGS. 13(a) to 13(c) are waveform diagrams of the voltage V of the power source, the voltage V1 of the electrolytic capacitor C1, the voltage V2 of the electrolytic capacitor C2 and an output current I. A reference character t on the abscissa denotes time. The positive half cycles of the power source voltage V are represented by P1, P2 and the like, and the negative half cycles of the power source voltage V are represented by N1, N2 and the like.

It is assumed that the power source is turned on at a time point t=0. The charging of the electrolytic capacitor C1 through the diode D3 is started in the first positive half cycle P1. At the same time, the reference electrolytic capacitor C01 is charged through the diode D1. The power source voltage V reaches a peak value Vp, and then starts decreasing from the peak value Vp. At this time, the electrolytic capacitor C1 starts discharging. However, the reference electrolytic capacitor C01 does not discharge, but is kept at the peak voltage Vp. When the power source voltage V reaches a voltage level Vp−E1, the switching transistor Q1 is turned off by the operation of the voltage comparator A1. Thus, the electrolytic capacitor C1 stops discharging, and its voltage is kept at the level Vp−E1.

In the negative half cycle N1, the electrolytic capacitor C2 is charged through the diode D4. The power source voltage V reaches a peak value −Vp, and then starts increasing from the peak value −Vp. At this time, the electrolytic capacitor C2 starts discharging. However, the reference electrolytic capacitor C02 does not discharge, but is kept at the peak voltage −Vp. When the power source voltage V reaches a voltage level −Vp+E2, the switching transistor Q2 is turned off by the operation of the voltage comparator A2. The electrolytic capacitor C2 stops discharging, and its voltage is kept at the level −Vp+E2.

When the power source voltage V exceeds the voltage level Vp−E1 in the midst of the next positive half cycle P2, the charging of the electrolytic capacitor C1 is resumed.

When the power source voltage V is reduced below the voltage level −Vp+E2 in the midst of the next negative half cycle N2, the charging of the electrolytic capacitor C2 is resumed.

In this way, the charging and discharging of the electrolytic capacitors C1 and C2 are carried out only when the power source voltage V is higher than the voltage level Vp−E1 and is lower than the voltage level −Vp+E2.

The electric current I flows when the electrolytic capacitors C1 and C2 are charged and discharged as shown in FIG. 13(c). The level of the electric current I is determined by the settings of the voltage levels −E1 and E2. By variably setting the voltage levels −E1 and E2, the electric current level I is varied.

While the embodiments of the present invention have thus been described, the invention is not limited to these embodiments. For example, a half-wave type current source according to the present invention can be provided by employing either the positive half-wave variable current circuit G1 or the negative half-wave variable current circuit G2 shown in FIG. 10 or 12.

The invention claimed is:

1. A voltage source comprising a serial capacitor connected in series between an AC power source and a load, and a first voltage limiting circuit and a second voltage limiting circuit connected in parallel to the load,
   the first voltage limiting circuit comprising a first switching element and a first capacitor connected in series,
   the second voltage limiting circuit comprising a second switching element and a second capacitor connected in series,
   wherein the first switching element is constantly conductive to an electric current flowing in one direction for charging the first capacitor in a positive half cycle of the AC power source, and is controllably turned on and off for an electric current flowing in the other direction, wherein, when a voltage of the first capacitor exceeds a predefined positive voltage level (E1), the first switching element is turned on to keep the first capacitor at the predefined positive voltage level (E1) and, when the voltage of the first capacitor is reduced below the predefined positive voltage level (E1), the first switching element is turned off, wherein the second switching element is constantly conductive to an electric current flowing in one direction for charging the second capacitor in a negative half cycle of the AC power source, and is controllably turned on and off for an electric current flowing in the other direction, wherein, when a voltage of the second capacitor is reduced below a predefined negative voltage level (−E2), the second switching element is turned on to keep the second capacitor at the predefined negative voltage level (−E2) and, when the voltage of the second capacitor exceeds the predefined negative voltage level (−E2), the second switching element is turned off.

2. A voltage source as set forth in claim 1, wherein the predefined positive voltage level and the predefined negative voltage level are continuously variable.

3. A voltage source as set forth in claim 1, wherein the first capacitor and the second capacitor each comprise an electrolytic capacitor.

* * * * *